3,687,757
METHOD OF MAKING TIRES
Hans Menell, Ahlem, Germany, assignor to Continental
Gummi-Werke Aktiengesellschaft, Hannover, Germany
Filed Feb. 9, 1970, Ser. No. 9,494
Claims priority, application Germany, Feb. 8, 1969,
P 19 06 294.3
Int. Cl. B29h 17/24
U.S. Cl. 156—126
2 Claims

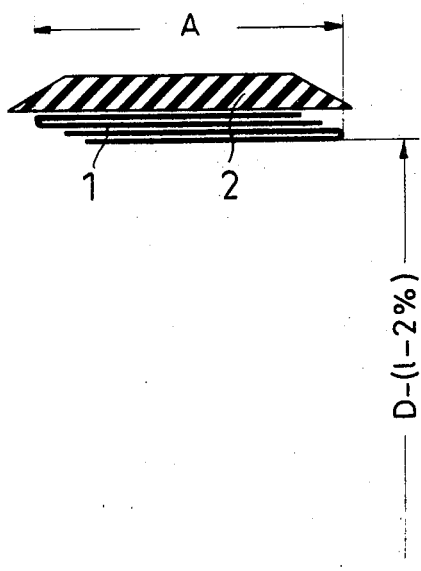
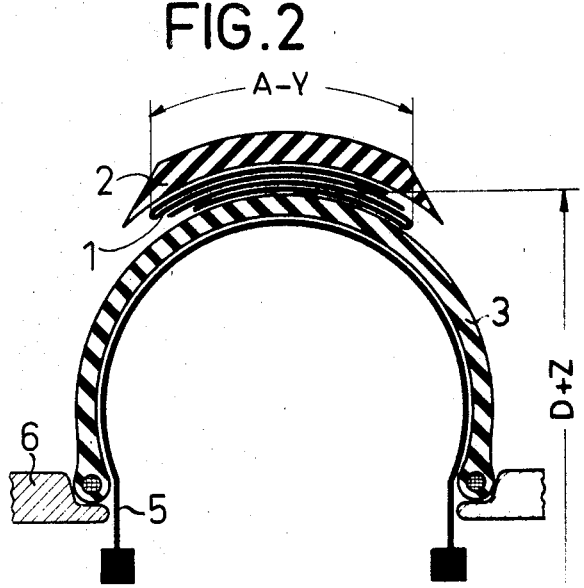
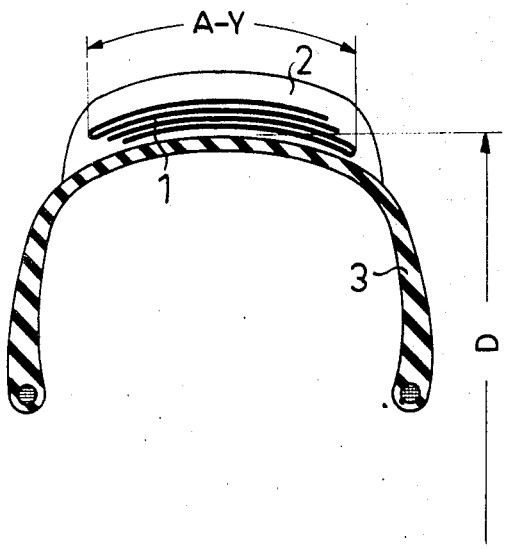
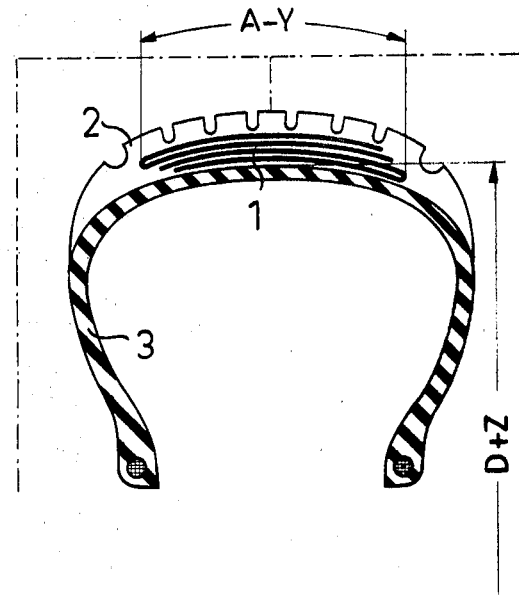

ABSTRACT OF THE DISCLOSURE

A method of producing tires with a belt located between tread surface and carcass and provided with intercrossing strength members, according to which, the belt with tread strip on one hand, and the carcass on the other hand, are made separately, whereupon the belt and the carcass are united to each other by curving the carcass into the belt while enlarging diameter of the belt to approximately the extent to which the tire has to be enlarged in diameter during its vulcanization.

---

The present invention relates to a method of making tires with a belt located between the tread surface and the carcass and provided with intercrossing strength carriers. The belt (with tread strip) which is produced by itself, is on one hand connected to the carcass, which is likewise produced by itself, by curving the carcass into the belt, and the thus produced raw tire is, in a vulcanizing mold, profiled by widening and is subsequently vulcanized.

According to the heretofore known manufacturing methods for so-called belted tires, the belt is, together with a tread strip, built up on a cylindrical drum. Subsequently, the belt, together with the tread strip, is moved over a carcass which first has a cylindrical shape whereupon said carcass by increasing the diameter is from the inside caused to engage the belt. In this way, a complete surface engagement between the carcass and the belt does not occur. Such complete surface engagement over the entire width of the belt is not required because such complete engagement is realized by the fact that the belt together with the tread strip is, by suitable devices as for instance rollers acting from the outside of the strip, pressed against the carcass. This rolling on from the outside results in a widening of the belt which in its turn, however, leads to local changes in the the windings of the belt threads.

Inasmuch as during the molding of the raw tire in the vulcanizing mold for purposes of pressing the tread strip rubber into the depressions of the mold, an increase in the diameter of the belt is necessary, again changes in the location of the belt threads occur inasmuch as changes in the diameter of the belt are possible normally only by changing the thread angle.

It is, therefore, an object of the present invention to provide a method which will overcome the above mentioned drawbacks.

It is another object of this invention to provide a method as set forth in the preceding paragraph, which will practically exclude any changes in the angle of the belt threads.

It is a further object of the present invention to develop a method which will make superfluous the employment of rollers or the like for pressing the belt and the tread strip against the carcass after the carcass has been curved into the belt.

These and other objects and advantages of the invention will appear more clearly from the following specification in connection with the accompanying drawing, in which:

FIG. 1 diagrammatically illustrates a partial section through a tire belt with tread strip.

FIG. 2 is a partial section through the tire carcass still on a carcass building device, together with the belt and the tread strip in partial section.

FIG. 3 shows a partial section through the raw tire removed from the building-up device.

FIG. 4 is a partial section through the completed tire, the cross-sectional contour of which corresponds to the vulcanizing mold only diagrammatically indicated in FIG. 4.

The method according to the present invention is characterized primarily in that the belt when the carcass is being curved into the belt, is widened to an extent which corresponds to the extent to which the raw tire has to have enlarging of the diameter thereof or has to be widened when being molded in the vulcanizing mold. Expediently, the belt is during the curving of the carcass enlarged in diameter or widened to an extent which is slightly in excess of the necessary enlargement in diameter widening in the vulcanizing mold. This widening of the belt by curving the carcass into the belt brings about a reduction in the width of the belt while an elastic tension of its own is induced in the not yet vulcanized rubber material between the belt threads. If now the thus prepared raw tire is lifted off from the tire building machine, the above mentioned elastic tension of the unvulcanized rubber brings about a shrinkage of the zenith portion of the raw tire while, however, the width of the belt is retained and the reduction in the diameter is effected by an upsetting of the belt threads. When inserting the raw tire into the vulcanizing mold, the raw tire is, in a manner known per se, widened or enlarged in diameter while the belt width of the raw tire is retained and the diameter of the raw tire is increased by eliminating the upsetting of its belt threads. Since, consequently, in the vulcanizing mold there occurs merely a stretching of the belt threads, namely by eliminating the upsetting of the said threads, changes in the angle of the belt threads will be eliminated. This brings about that the belt threads of the finished tire will occupy the precise prescribed position. Distortions or changes in the angle of the threads which occur with heretofore known methods are thus eliminated. Since during the remaining rising of the raw tire in the vulcanizing mold, the belt thus undergoes merely a change in diameter but not simultaneously also a reduction in width, a precise central location of the belt will be assured with the completed tire.

Referring now to the drawings in detail, the belt 1 comprising a plurality of cord fabric layers is, in a manner known per se, provided with pull-resistant threads or the like strength members in such a way that the cord threads of adjacent layers cross each other and in this condition form with the circumferential direction of the tire angles of from 15 to 30°. The tire belt 1 is built up on a cylindrical drum (well known in the art and, therefore, not illustrated), and after the belt 1 has been fully built up, the tread strip 2 is, in a manner known per se, placed upon the belt 1. The inner diameter of the belt 1, which latter has the width A, or the outer diameter of the pertaining building drum is by from 1 to 2% shorter than the diameter D.

The carcass 3 with the cord threads which are embedded in a manner known per se and extend transverse to the circumferential direction of the tire, is built so as to have a hollow cylindrical shape, said cord threads being anchored to the beads 4. Thereupon a curving device is applied which comprises primarily an inflating body 5 and bead seating rings 6.

The belt 1 with the tread strip is, in conformity with FIG. 1, arranged concentrically and centrally with regard to the carcass 3 which first has a hollow cylindrical shape. Thereupon the carcass has its diameter increased by introducing a pressure medium into the inflating body 5 so that the carcass assumes an approximately semicircular shape. This increase in diameter of the carcass is effected to such an extent that the belt 1 is grasped from the inside while the inner diameter of the belt 1 is increased to the diameter $D+Z$, and the width or enlarging of the diameter of the belt automatically reduces itself in view of a decrease in the angle of the belt threads to $A-Y$. This widening of the belt 1 is effected while the non-vulcanized rubber material between the individual belt threads is deformed elastically.

The now completed raw tire is taken off the device according to FIG. 2. The preload which was introduced into the rubberizing material of the belt 1 will now, in conformity with FIG. 3, bring about a reduction in the diameter, as the individual belt threads will be upset in themselves, which means in the longitudinal direction of the threads. Consequently, no increase in the width of the belt occurs, the belt rather retains its width $A-Y$.

The raw tire according to FIG. 3 is now placed into the vulcanizing mold and has here to be widened in a manner known per se in order to permit the tread strip 1 to penetrate into the depressions of the vulcanizing mold. In this way the tread strip profile will be obtained. This remaining rising or increase in diameter of the belt 1 to the value $D+Z$ results, however, merely in the elimination of the upsetting in the belt threads. In this connection the width of the belt is not changed. The belt retains the width $A-Y$. The molding of the raw tire in the vulcanizing mold, therefore, does not bring about any or any material changes in the location and angle of the belt threads. No relative movements of the belt threads with regard to the carcass 3 occur so that a belt 1 placed upon the carcass 3 in conformity with the prescriptions and centrally, will maintain its prescribed or intended position. Thus, the tire excels by a precisely centrally arranged central belt 1.

It may be repeated that the object of the present invention consists in introducing into the belt such a tension and, more specifically, on the device according to FIG. 2, that a shrinkage which may occur after removal of the raw tire from the device according to FIG. 2, will be eliminated in the vulcanizing mold precisely or for all practical purposes precisely during the remaining rising in the vulcanizing mold. Since, however, the raw tire after removal from the device according to FIG. 2 does not regain its original diameter, even though the belt was widened so to speak elastically, the increase in diameter on the device according to FIG. 2 must be greater to a certain extent than the increase in the diameter which is necessary in order to assure the remaining rising in the vulcanizing mold. Since generally an increase in diameter or a remaining rising in the vulcanizing mold by about 3% is necessary, a belt widening or increase in diameter on the device according to FIG. 2 is required by about 4%. A belt which has been increased in diameter by 4% will after removal of the raw tire from the device according to FIG. 2 spring-in by a diameter value of approximately 3%, and this reduction corresponds to the remaining rising or the required increased in diameter in the vulcanizing mold or in the finish diameter according to FIG. 4.

It is, of course, to be understood that the present invention is, by no means, limited to the particular construction shown in the drawing but also comprises any modifications within the scope of the appended claims.

What I claim is:

1. A method of making a belted tire in which an extensible belt of a plurality of layers of intercrossing filamentary strength members is positioned within a tread surface and outwardly of the tire carcass, which includes the steps of: forming said belt in cylindrical form within the tread strip, and 4% to 5% smaller in diameter than its finished shape, forming said carcass in substantially cylindrical shape, expanding said carcass to a shape curved in cross section and positioning said belt with tread strip on said carcass, further expanding said carcass to curve said belt and to increase the diameter of said belt by 4% to its finished diameter, removing the expanding force and allowing said belt and tire carcass to decrease in diameter by the resilience of the unvulcanized material, and expanding said tire in a mold to finished diameter and vulcanizing said tire to shape the carcass with said belt substantially the said finished diameter.

2. A method of making a tire according to claim 1, in which the increase of diameter of the extensible belt by about 4% reduces the width of said belt to its finished width, and the belt retains said width when the expanding force is removed.

References Cited

UNITED STATES PATENTS 3,475,254  10/1969  Henley _____ 156—123 X

STEPHEN C. BENTLEY, Primary Examiner